United States Patent [19]

László et al.

[11] Patent Number: 4,576,422

[45] Date of Patent: Mar. 18, 1986

[54] ROLLER SHOE STRUCTURE

[75] Inventors: Fiák László; Derzsényi Sándor; Darin Sándor, all of Debrecen, Hungary

[73] Assignee: Magyar Gordulocsapagy Muvek, Debrecen, Hungary

[21] Appl. No.: 705,971

[22] Filed: Feb. 27, 1985

[51] Int. Cl.[4] .............................................. F16C 29/06
[52] U.S. Cl. ..................................................... 308/6 C
[58] Field of Search ................... 308/6 C, 6 R, 6 A; 464/168

[56] References Cited

U.S. PATENT DOCUMENTS

| 3,642,330 | 2/1972 | Newman | 308/6 C |
| 3,845,993 | 11/1974 | Schiler | 308/6 C |
| 4,302,059 | 11/1981 | Teramachi | 308/6 R |
| 4,352,526 | 10/1982 | Imai | 308/6 C |

FOREIGN PATENT DOCUMENTS 2121847 11/1972 Fed. Rep. of Germany .
2202085 8/1973 Fed. Rep. of Germany .
178294 11/1983 Hungary .

Primary Examiner—Lenard A. Footland
Attorney, Agent, or Firm—Mandeville & Schweitzer

[57] ABSTRACT

A roller shoe structure for high-accuracy straight-line guiding of construction units moving on other comprises a main body with component parts forming straight-line sections of a self-recurrent closed roller guiding raceway, raceway sections reversing the motion of the rollers, and a train of load bearing rolling element with recirculation motion, characterized in that side-guide clamping grooves ($z_1$) and retaining insert clamping grooves ($z_2$) are shaped in the main body (1) for engaging the main body (1) with side-guides (2), which ensure straight-line guiding of the rolling elements (5), and retaining inserts (3), which prevent the rolling elements from dropping out of the roller shoe structure if not built in, respectively, without using any binding element.

3 Claims, 14 Drawing Figures

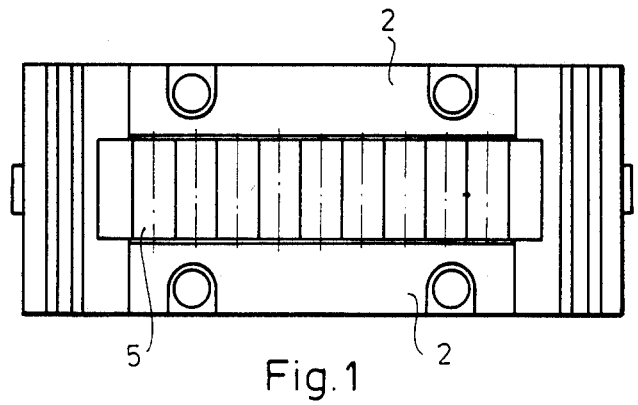
Fig. 1
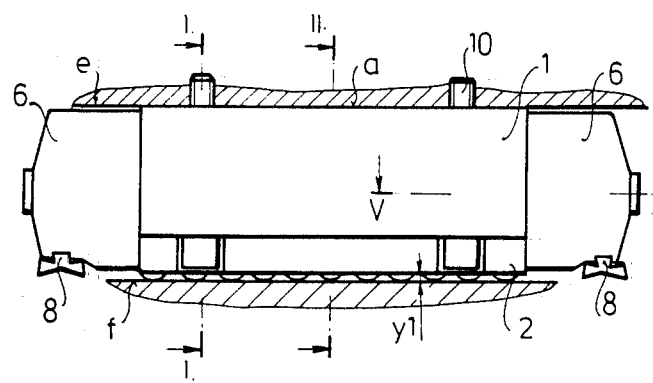 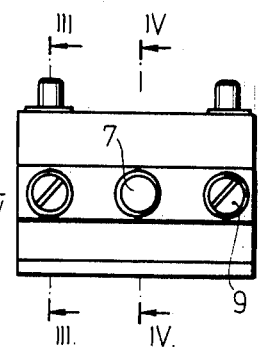
Fig. 2  Fig. 4
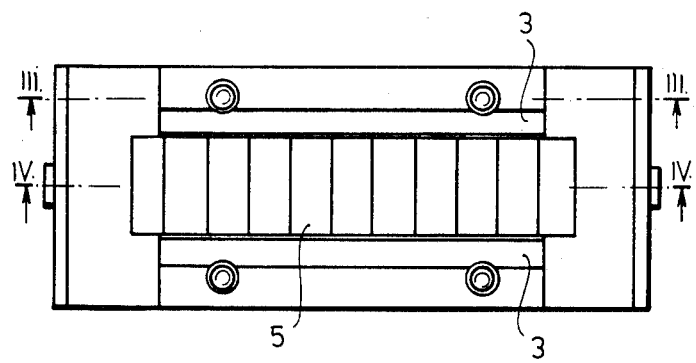
Fig. 3

ROLLER SHOE STRUCTURE

The invention relates to a so called roller shoe structure which ensures straight-line guiding of machine parts, e.g. slides, tables etc. moving on each other. The construction according to the present invention has essential advantages with respect to the known ones as far as manufacturing and functional durability are concerned.

The advantages are exclusively due to the construction according to the present invention which differs from all known and patented roller shoe structures.

One part of patent specifications on roller shoe constructions, e.g. U.S. Pat. Nos. 3,111,350, 3,955,513, DE-PS No. 2 239 782, No. 2 416 198, No. 2 123 529, CH-PS No. 572 168 and GB-PS No. 1 407 387 relate to structure of spacers between the rolls, other patent specifications offer solutions to the shape of grooves formed in the main body and to the method of clamping of end-guides. U.S. Pat. Nos. 3,920,289, 3,915,513, DE-PS No. 2 116 322, 2 421 328, 2 202 085 fall within last-mentioned sphere.

There are patents relating to roller shoe structure which are focussed on forming load-bearing surfaces and decreasing dynamic forces arising at inlet and outlet edges by applying cuttings. Such patents are described in U.S. Pat. No. 3,977,736, CH-PS No. 594 148, GB-PS No. 1 380 221 and DE-PS No. 2 121 847.

British patent specifications No. 1 472 287 and 1 474 051 relate to constructions entirely dissimilar to the subject matter of the present application.

The construction of roller-shoe described in HU-PS No. 178 294 also essentially differs from the solution of the present application. On the one hand it contains several sophisticated component parts which do not take part directly in the main operation and can be manufactured expensively, on the other hand the joining of sophisticated and articulated component parts needs a lot of binding elements superfluously and constitutes the source of inaccuracies of adjustment.

The forming of the main body, underlined in this latter patent specification as an advantage, according to which the load bearing surface is uniplanar with other surfaces of the main body containing different grooves and holes, is expressively disadvantageous because during machining these surfaces with plane grinding significant surface waviness originate in the line of the holes from their effect of grinding wheel regulation.

The lapping process ensures exclusively the decreasing or removing of this surface waviness because it does not effect the service time and accuracy characteristics of the roller shoe.

The service time determining surface finish carried out by high accuracy plane grinding is ensured not by the lapping but by the "gobbling" effect of the rolling elements.

The construction according to the invention is based on the perception that, with respect to performing the main functions, i.e. the transmission of load and power, the roller shoe structure has two significant component parts, namely the main body and the rolls.

The number of component parts used for auxiliary functions is decreased to minimum and their construction meets the requirements of profitable mass production with high accuracy.

The invention will now be described in detail with reference to drawings showing real embodiments of the roller shoe structure.

In the accompanying drawings:

FIG. 1 is a bottom view of the roller shoe structure according to the invention showing its operating surface;

FIG. 2 is a side-view of the structure of FIG. 1;

FIG. 3 is a top-view of the structure of FIG. 1, i.e. a view of its surface joined with construction unit to be guided in straight-line;

FIG. 4 is a view of the end of the structure of FIG. 1 taken in directions of advancement;

Figure 5:
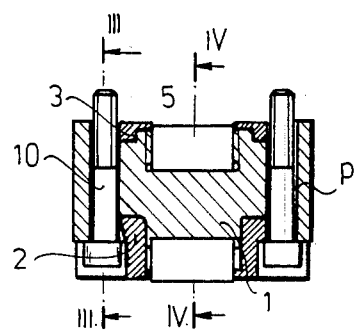
FIG. 5 is a sectional view taken on line I—I of FIG. 2.

As shown in the figures, the main component parts of the roller shoe structure are main body 1, rolling elements 5 as well as side-guide 2.

The outlet, inlet and reversal of the rolling elements are carried out by end-guides 6 and arcuate inserts 4. Retaining inserts 3 may prevent the rolling elements 5 held in guiding grooves shaped by surfaces d-$m_2$ of the main body 1 from dropping out of the completely mounted but not built-in roller shoe unit. On the opposite operating surface side g, the same duty is performed by retaining rims $n_1$ of the side-guides 2, which hold the rolling elements 5 in raceway groove shaped by guiding surfaces $m_1$ of side-guides 2 and load bearing surface b of the main body 1.

Plugs 7 close the holes of the end-guides 6 formed to induct lubricants. Erasing inserts 8 locked in the end-guides 6 provide for cleaning raceway surface of guide rail f and prevent pollution from getting into the inner part of the roller shoe.

The end-guides 6 are fixed to the main body 1 with end-guide screws 9.

The lock of the roller shoe to clamping surface e of a moving machine part may be carried out either by drift bolts 10 or by the connection of drift bolts arranged in the moving machine part with outer drift bolt thread M formed in the main body 1.

The cross section view of main body 1 (FIG. 9) shows all the surfaces and surface configurations playing essentially particular role both in the relation of some component parts of the roller shoe and in its operation; at the same time these surface configurations represent the absolute novelty of the roller shoe according to the invention with respect to all known constructions.

Clamping surface a, which forms the static load bearing surface of main body 1, is connected to clamping surface e of moving machine part by means of that the heads of drift bolts 10 being supported on spot face c lock the main body 1 directly to moving machine part through drift bolt holes p.

The lock of the load bearing surface b and the clamping surface e to each other without displacement and without using the drift bolts 10 may be carried out also by engaging of drift bolts arranged in a moving machine part with outer drift bolt threads M formed in the main body 1.

The side-guides 2 are connected to main body 1 continuously without any binding cement but in a built-up way through clamping grooves $z_1$ with trapezoidal section.

The retaining inserts 3 are also connected to main body 1 continuously without any binding element but in a built-up way through clamping grooves $z_2$ with trapezoidal section.

The rolling elements 5 not loaded are returned again through the end-guides 6 in return groove shaped by side surfaces $m_2$ and bottom surface d of the main body 1 into load bearing raceway groove formed by load bearing surface b and guiding surfaces $m_1$ of the side-guides 2. The load bearing surface b is formed in the main body 1 from the side of roller shoe structure and is the so called inner raceway plane.

The plane of load bearing surface b in main body 1 has a lift x with respect to spot face c of the heads of drift bolts 10 so that machining the load bearing surface b and spot face c may be carried out independently of each other, which effect accuracy and service time of the roller shoe favourably. Thereby holes p in spot face c formed for drift bolts 10 do not effect surface finish characteristics achieved by machining of the load bearing surface b unfavourably.

Figure 7:
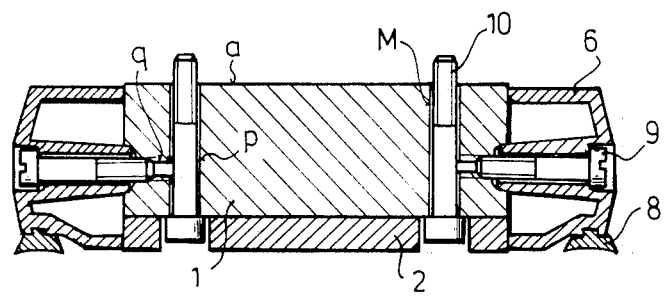
FIG. 7 is a vertical longitudinal sectional view taken on line III—III of FIGS. 3, 4, 5 and 6.
Figure 9:
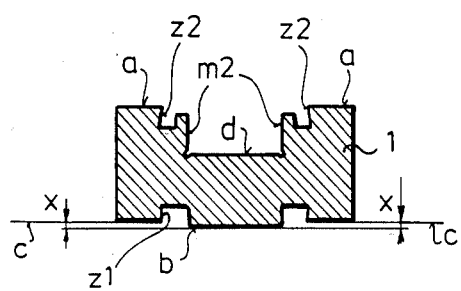
FIG. 9 is a cross-section of the main body of roller shoe structure.

The main body 1 therefore on the whole is a prism-shaped body with cross-section of FIG. 9 pinked in cross direction between spot face c and clamping surfaces a by holes p for drift bolts 10 as shown only in FIGS. 5 and 7.

Figure 8:
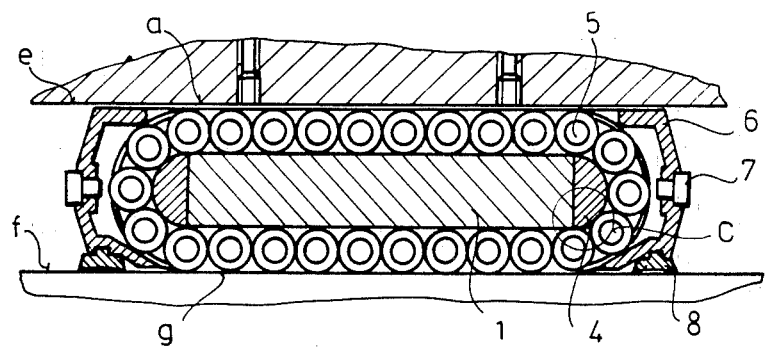
FIG. 8 is a vertical longitudinal sectional view in medium plane taken on line IV—IV of FIGS. 3, 4, 5 and 6.
Figure 6:
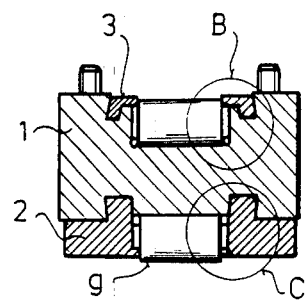
FIG. 6 is a sectional view taken on line II—II of FIG. 2.
Figure 12:
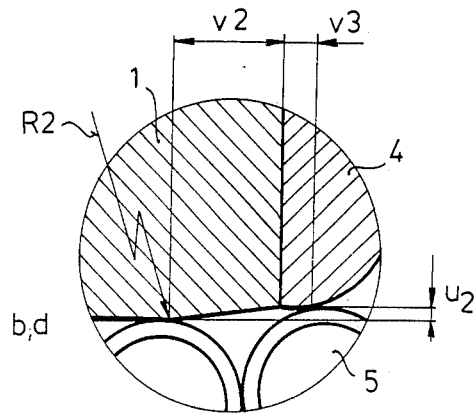
FIG. 12 is an enlarged view of detail C of FIG. 8 showing structure relations of admission of rolling elements on the load bearing surface of the main body as well as an arcuate insert formed to ensure a raceway so as to return the rolling elements therein.

The load bearing surface b and roller returning bottom surface d of the main body 1 are shaped in the vicinity of inlet and outlet of rolling elements according to FIG. 8 and detail C of FIG. 12. Construction of detail C therefore is valid in the proper sense for all four points of inlet and outlet of the guiding of rolling elements.

According to the above mentioned, both surfaces b and d have a roller inlet section $v_2$ of height $u_2$ in the point of plane of connection to arcuate inserts 4 and are connected to surfaces b and d with transitional arcs $R_2$, respectively.

The roller inlet section $v_2$ of height $u_2$ adjoining by transitional arc $R_2$ is of fundamental importance as far as operating characteristics and durability of the roller shoe structure are concerned.

Figure 13:
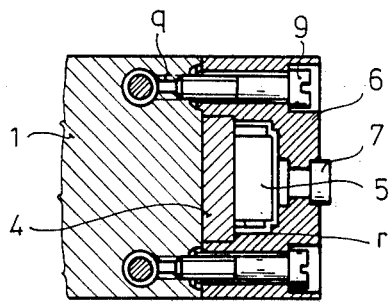
FIG. 13 is a horizontal partial longitudinal sectional view taken along the line V—V of FIG. 2.

Threaded adjusting holes q of the main body 1 serve for mounting the end-guides 6 comprising the arcuate inserts 4 as shown in FIGS. 7 and 13.

The threaded adjusting holes q and drift bolt holes p extend to each other owing to manufacturing reasons.

Figure 11:
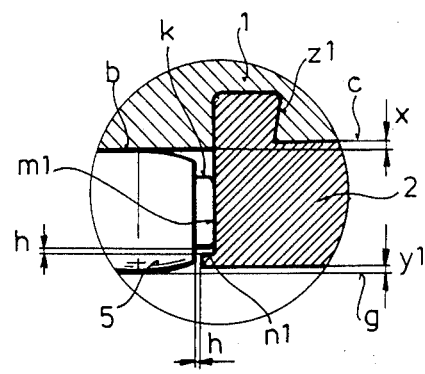
FIG. 11 is an enlarged view of detail A of FIG. 6 showing structure relations of the main body, the rolling elements running on the load bearing surface and side-guide.

The main role of the side-guide 2 is, as shown in detail A of FIG. 11, to guide the rolling elements 5 by guiding side surfaces $m_1$, i.e. to take lateral forces in the plane of said surfaces $m_1$ in form of sliding friction. Retaining rim $n_1$ prevents the rolling elements 5 from falling out of the roller shoe not built in.

Gap h between retaining rim $n_1$ and rolling element stud k serves for decreasing inner friction.

There is an operating surface lift or gap $y_1$ between the lower plane determined by side-guides 2 and the guide raceway surface, which is identical with operating surface g of the rolling elements 5, i.e. with the outer raceway plane.

Figure 10:
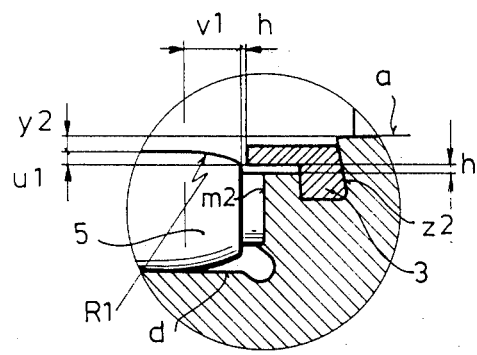
FIG. 10 is an enlarged view of detail B of FIG. 6 showing structure relations of the main body, the rolling elements returned therein and a holder.

The only role of retaining insert 3 is to prevent, as shown in detail B of FIG. 10, the rolling elements 5 from dropping out of return groove by rim $n_2$ if the roller shoe is not built in.

The gap h between the rim $n_2$ of retaining insert 3 and the roller stud k of rolling elements 5 provide for decreasing inner friction.

The arcuate inserts 4 are engaged in the end-guides 6 by fitting rim r and serve as an arcuate raceway for the rolling elements 5 within the end-guides 6.

Constructional relations of arcuate inserts 4 to other component parts are shown in FIGS. 8, 12 and 13.

As shown in FIG. 12, cylindrical surfaces of the arcuate inserts 4 are connected to roller inlet section $v_2$ of the main body 1 through fitting transition $v_3$.

The rolling elements 5 perform their endless motion through three different raceway sections.

The first section is a load bearing raceway groove flanked with load bearing surface b of the main body, guiding surfaces $m_1$ of the side-guides 2 as well as raceway surface of the guide rail f.

The rolling elements 5 are loaded only in the section mentioned hereinabove and they transmit load force between load bearing surface b of the main body 1 and raceway surface of the guide rail 5 perpendicularly to said surfaces.

Lateral, i.e. sliding forces in mantle plane of the rolling elements 5 arise in the case of inaccurate building in of the roller shoe mechanism, that is if the moving machine part to be guided in straight line is "slinking". Said forces are taken by side-guides 2.

The second section is a reversal of straight-line motion of rolling elements along an arc of 180°. Guiding the rolling elements 5 back is carried out in reversing raceway shaped in end-guides 6 with arcuate inserts 4.

The third section is a roller returning groove flanked by side surfaces $m_2$ shaped in the main body 1 and groove bottom surface d as well as clamping surfaces e for moving machine parts. In said section there is a gap $y_2$ between upper envelope surface defined by the rolling elements 5 and clamping surface e. To optimize strain distribution among the rolling elements 5 and the load bearing surface b as well as raceway surface of the guide rail f, the rolling elements 5 are shaped as shown in FIG. 10.

They are rounded-off at both ends; bend radius $R_1$ presents itself with a length of rounding $v_1$ and a height of rounding $u_1$.

The rolling element studs k ensure that the rolling elements 5 may be guided in a groove.

The end-guides 6 are engaged with the main body 1 by the end-guide screws 9 and the adjusting threaded holes q, as shown in FIG. 13.

Figure 14:
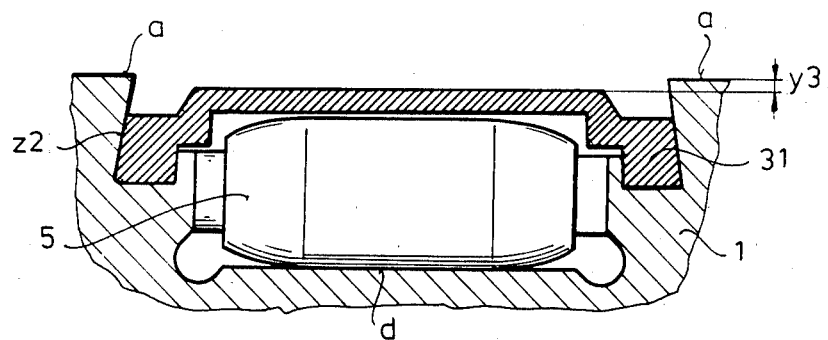
FIG. 14 is an embodiment of the roller shoe structure according to the invention with fully sealed return of the rollers.

FIG. 14 shows an embodiment of the roller shoe mechanism according to the invention, in which the role of retaining insert 3 becomes wider and covers not only the holding of the roller elements 5 in returning groove but also a complete dust protection of said groove. A dust-proof retaining insert 31 engaged with the clamping grooves $z_1$ of the main body 1 closes the returning groove perfectly. To avoid redundant constraint, a gap $y_3$ is provided between the upper surface of the dust-proof retaining insert 31 and the clamping surface.

Material of the main body 1 and the rolling elements 5 is bearing-steel with high strength, the rest of all component parts with the exception of end-guide screws 9 and drift bolts 10 may be manufactured of plastic or light metal with various strength and hardness.

Higher strength and abrasion resistance requirements are raised with respect to side-guides 2 and end-guides 6.

We claim:

1. A roller shoe structure for high-accuracy straight-line guiding of construction units moving on each other comprising a main body with component parts forming straight-line sections of a self-recurrent closed roller guiding raceway, raceway sections reversing the motion of the rollers, and a train of load bearing roller elements with recirculation motion, characterized in that side-guide clamping grooves ($z_1$) and retaining insert clamping grooves ($z_2$) are shaped in the main body (1) for engaging said main body (1) with side-guides (2), which ensure a straight-line guiding of the rolling elements (5), and retaining inserts (3), which prevent said rolling elements from dropping out of the roller shoe structure if not built in, respectively, without using any binding element.

2. A roller shoe structure according to claim 1, characterized in that load bearing surface of the main body (1) is not uniplanar with spot faces (c) of drift bolt heads, which limit said body (1) against rolling raceway surface of guide rails (f), but has a lift (x) with respect to said spot faces (c) so that accuracy of manufacture may be increased.

3. A roller shoe structure according to claim 1, characterized in that, for the sake of longer service time, more favourable operating characteristics, uniform, true and noiseless running, the load bearing surface (b) of said main body (1) is provided with inlet and outlet sections ($v_2$) connected thereto by transitional arcs ($R_2$) with a well defined height ($u_2$), ensuring a uniform and gradual taking up of the load.

* * * * *